Sheet 2. 2 Sheets.

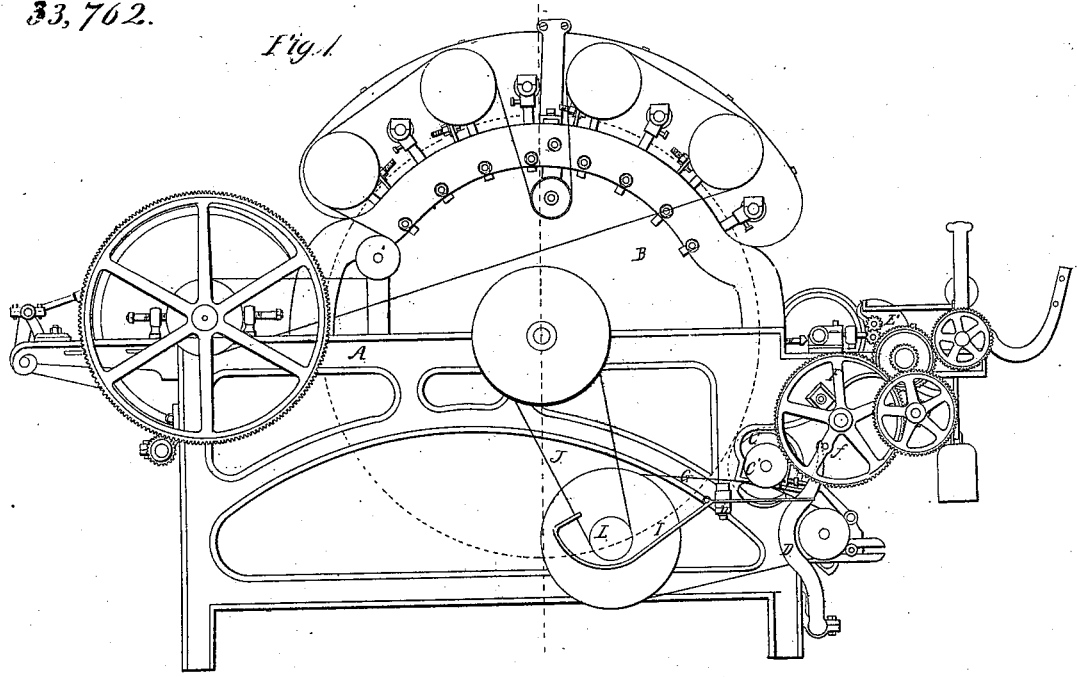
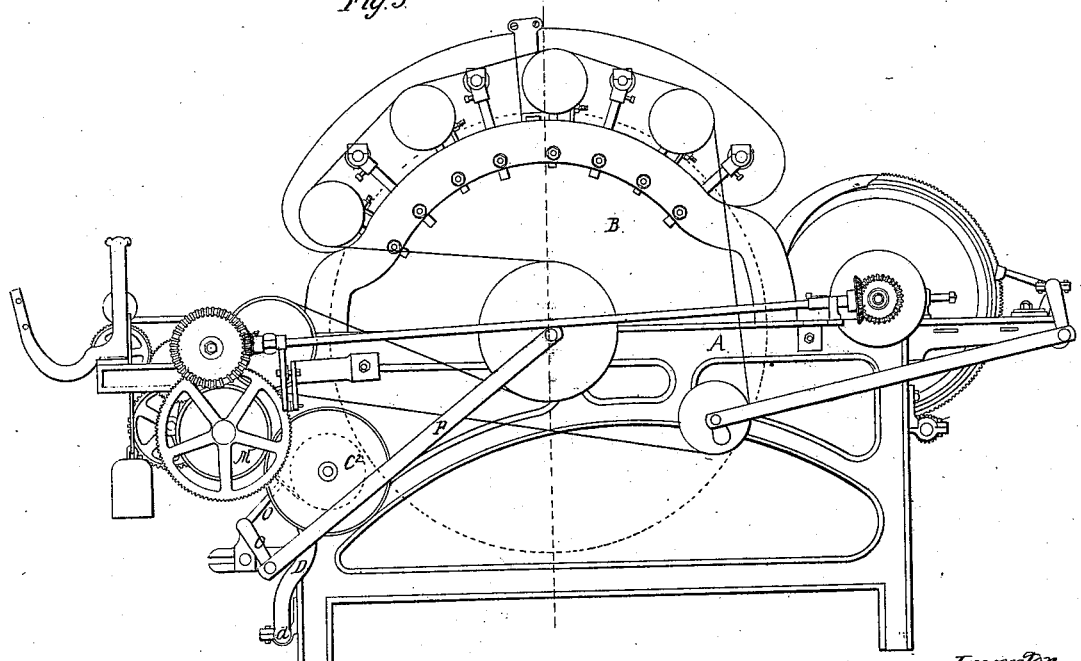

G. Bradley.
Card Cleaner.

N° 2,758.
N° 33,762.
Patented Nov. 19, 1861.

Witnesses:
Inventor:
George Bradley

UNITED STATES PATENT OFFICE.

GEORGE BRADLEY, OF PATERSON, NEW JERSEY, ASSIGNOR TO JACOB S. ROGERS.

IMPROVEMENT IN CARDING-ENGINES.

Specification forming part of Letters Patent No. 33,762, dated November 19, 1861.

*To all whom it may concern:*

Be it known that I, GEORGE BRADLEY, of Paterson, in the county of Passaic and State of New Jersey, have invented a certain new and useful Improvement in Carding-Engines; and I do hereby declare that the following is a full and exact description of the same, reference being had to the accompanying drawings, forming part of this specification, which represent sufficient of the entire machine to give a full knowledge of the invention.

Figure 2:
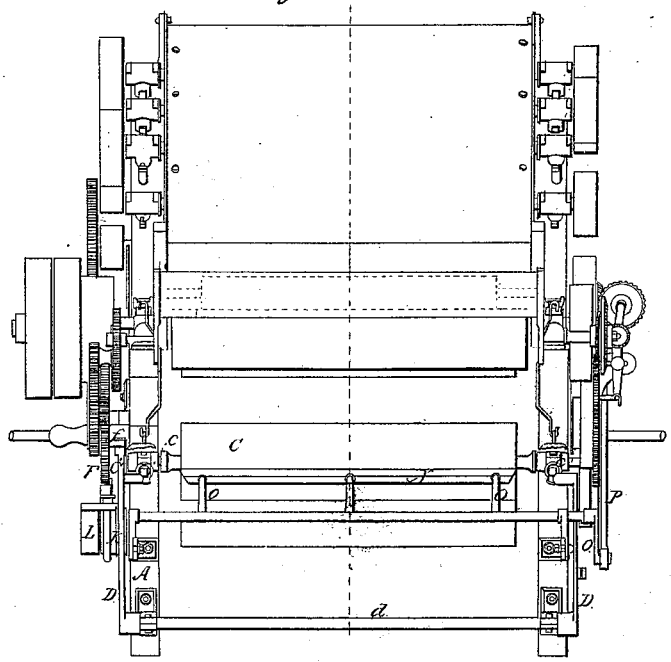
Figure 4:
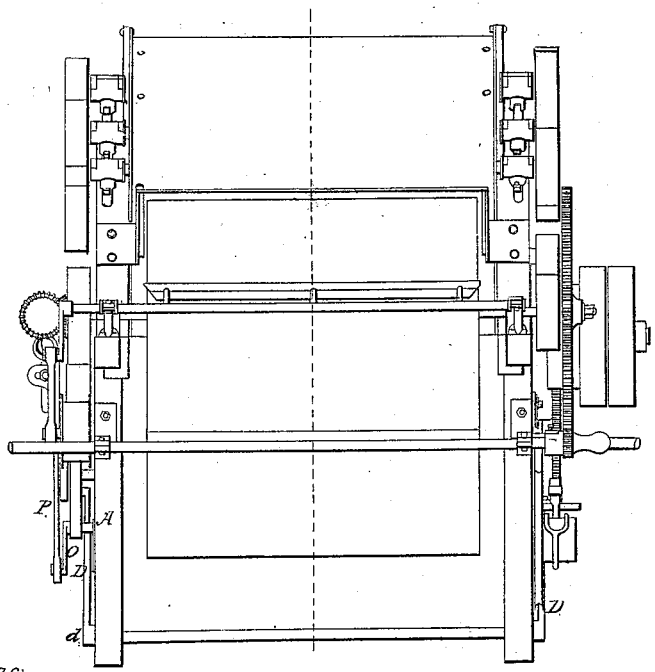

Figure 1 is a side elevation. Fig. 2 is an elevation of the end, which is seen at the right in Fig. 1. Fig. 3 is an elevation of the side opposite to Fig. 1, and Fig. 4 shows the end opposite to Fig. 2.

Similar letters of reference indicate like parts in all the figures.

My invention relates to the means of stripping the cylinder.

It consists, first, in the employment of a stripping-cylinder so constructed and operated that it runs in contact with the main cylinder and with a proper motion for a sufficient time to strip it and to retain the stripping upon itself, and is then automatically moved out of contact therewith, and is itself stripped or cleaned by suitable mechanism, depositing the strippings in a receptacle apart from the cotton which is being carded; and, second, in reversing the motion of the stripping-cylinder after it leaves the main cylinder and turning it slowly in that direction, thereby submitting its surface to the action of a comb or equivalent device, in combination with a motion of the said stripping-cylinder to and from the main cylinder, so that the strippings which have adhered to its surface while in contact with the main cylinder may be removed and deposited in their proper receptacle.

To enable others skilled in the art to make and use my invention, I will proceed to describe its construction and operation by the aid of the drawings.

A is the frame, and B the main cylinder.

C is the stripper. It is mounted in slides $c\ c'$, adapted to move to a short distance on the frame A, and its motion thereon is controlled by means of a pivoted frame D, which latter is connected to the frame by a suitable axis at $d$. By means of a suitable train of gearing a very slow rotation is given to the large gear-wheel F. The latter carries a pin $f$, which at each revolution acts on D, moving it and holding C in contact with B during a short period, sufficient to entirely strip B. The motion of C during the period while it is acting upon B is received from the round belt G, which makes a complete revolution around the pulley C', as represented. Suitable gage-screws are provided, which limit the motion of C toward B, so that it shall never approach into too close and injurious contact.

When the frame D is by the onward motion of the pin $f$ released from the influence thereof, it withdraws C from B. In doing so it acts laterally or camwise upon and operates the lever I, which is pivoted at the point $i$ and is held against D by a spring. (Not represented.) I acts on the belt J, which has previously been running on the fast pulley K, and ships it upon a loose pulley L. The stripper, in consequence of the shipping of the belt, now ceases to be revolved as before, and the tension of a spring (not represented) presses it with sufficient force against the smooth pulley M, which is slowly rotated in the opposite direction to induce a corresponding slow rotation therewith. A smooth pulley $C^2$ is fitted on C to bear on M for this purpose. When C is again shifted into contact with B, the shipper I is thereby worked in the reverse direction and the fast pulley K again receives the belt J, driving C vigorously during a short period, until the withdrawal of C again ships J upon L, when the stripper is again slowly rotated backward by M.

A comb N is properly mounted on a frame O and receives a reciprocating motion from the main cylinder through the rod P. It is mounted in such position that it acts upon and cleans the entire surface of C during the period while the latter is in contact with M. The fibers and dirt detached from C by M fall into a suitable receptacle (not represented) and are removed by the attendant at proper intervals.

The periods during which my stripper C acts on B may be modified by varying the form of D at that part where it is acted on by $f$. The frequency of these periods may also be modified by varying the speed of the wheel F in any convenient manner. As it is undesirable to strip oftener than is necessary, because it would induce a rejection of too large a proportion of valuable fiber, and as the cylinder consequently should be stripped more frequently in some kinds of work and with some kinds of cotton than under different conditions, I propose to employ change-wheels, such as are frequently used in lathes and other machines, so that F may be rotated at a great variety of speeds. I prefer, however, to rotate F only once in about forty minutes under ordinary conditions, and to hold C in contact with B during less than one-twentieth of such period.

When desired, the strippers on an entire section of cards may be moved simultaneously by two shafts extending the whole length of the section, one shaft to drive the strippers, imparting thereto both the direct and indirect motion, the other shaft to move the strippers to their proper positions, each shaft being actuated by a small machine standing at the end of the section of cards. In such case one set of gearing operates the stripper of the entire section, be there more or less cards in it.

Having now fully described my invention, what I claim as new therein, and desire to secure by Letters Patent, is—

1. Causing a stripping-cylinder C, covered with card-clothing or equivalent material, which retains the strippings, to be automatically operated against the main cylinder so as to strip it during a certain period and then to be separated therefrom and to be in turn stripped or cleaned by suitable mechanism, and to deposit the strippings separate from the fibers which are being carded, substantially in the manner and for the purpose herein described.

2. Turning the stripping-cylinder C slowly backward or in the reverse direction to that in which it performs its function of a stripper, and thereby subjecting its surface to the action of the clearing-comb N or its equivalent, in combination with a motion of the said stripping-cylinder C to and from the main cylinder, substantially as and for the purposes herein set forth.

In testimony whereof I have hereunto set my name in the presence of two subscribing witnesses.

GEORGE BRADLEY.

Witnesses:
ROBT. S. HUGHES,
WILLIAM C. EVANS.